(12) United States Patent
Kirk et al.

(10) Patent No.: US 6,732,051 B1
(45) Date of Patent: *May 4, 2004

(54) SEAMLESS SURVEYING SYSTEM

(75) Inventors: Geoffrey R. Kirk, San Francisco, CA (US); Darin Muncy, San Jose, CA (US); Joseph V. R. Paiva, Shawnee, KS (US)

(73) Assignee: Trimble Navigation Limited, Sunnyvale, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 09/839,466

(22) Filed: Apr. 20, 2001

Related U.S. Application Data

(63) Continuation of application No. 09/177,780, filed on Oct. 22, 1998, now Pat. No. 6,343,254.

(51) Int. Cl.$^7$ .............................. G01C 21/26; G01S 5/14
(52) U.S. Cl. .............. 701/216; 342/357.06; 342/357.17
(58) Field of Search ..................... 342/357.06, 357.02, 342/357.17; 701/216

(56) References Cited

U.S. PATENT DOCUMENTS

| | | | | |
|---|---|---|---|---|
| 5,734,348 A | * | 3/1998 | Aoki et al. | 342/357.17 |
| 5,936,572 A | * | 8/1999 | Loomis et al. | 342/357.14 |
| 6,061,632 A | * | 5/2000 | Dreier | 701/215 |
| 6,343,254 B1 | * | 1/2002 | Kirk et al. | 701/216 |

* cited by examiner

Primary Examiner—Gregory C. Issing
(74) Attorney, Agent, or Firm—Wagner Murabito & Hao LLP

(57) ABSTRACT

A survey system and method for determining the best source of position data for a particular application. The system includes both an optical unit and a satellite positioning system (SATPS) unit for obtaining position data. The optical unit includes a theodolite and an electronic distance meter for determining the position of a rover unit. The SATPS unit includes a SATPS antenna and a SATPS receiver for receiving signals from satellites of the SATPS and a radio for coupling the received signals to the rover unit. The present invention automatically determines the best source of position data. The best source of position data is then used to calculate the position of the rover unit.

12 Claims, 11 Drawing Sheets

| OPTICAL VARIABLES | weighting factor |
|---|---|
| separation distance | 80% |
| signal strength | 20% |

| SATPS VARIABLES | weighting factor |
|---|---|
| separation distance | 80% |
| number of satellites | 10% |
| RTK correction data accuracy | 10% |

FIG. 9

SEAMLESS SURVEYING SYSTEM

This is a continuation of copending application(s) Ser. No. 09/177,780 filed on Oct. 22, 1998 now U.S. Pat. No. 6,343,254 which is hereby incorporated by reference to this specification.

TECHNICAL FIELD

This invention relates to systems and methods for determining position. More specifically, the present invention relates to an apparatus and method for determining the optimum source of data for position determination when GPS data and optical data may be available. The optimal source of position data is then used to determine position.

BACKGROUND ART

Historically, surveying has been accomplished using optical sighting methods. Optical sighting methods typically involve the determination of distance, vertical angle and horizontal angle and slope with reference to a known location at which a sighting device is operated (reference site) by sighting to a remote location which is positioned (the positioned site). Optical sighting methods provide a high degree of accuracy as long as the distance between the reference site and the staked site are short.

Recently, automated position determination systems have been used for position determination in surveying applications. One such system uses the constellation of Satellites in the Global Positioning System (GPS) operated by the U.S. Air Force. The GPS consists of a constellation of 24 orbiting satellites that transmit signals via microwave radio. These signals may be used by appropriately configured receivers to determine position.

One method for determining position uses the Coarse Acquisition (C/A) code from four or more satellites to determine position. The satellites mark their transmission digitally and the receiver compares the time it receives the time mark with its own time clock. The time delay, referred to as transit time, is typically in the range of about 70–90 milliseconds. Pseudoranges are then determined by multiplying transit time by the speed of radio transmissions (approximately 300,000,000 meters/second). Position is then determined using a geometric calculation that uses the ephemerides and calculated pseudoranges. GPS based positions are calculated using the World Geodetic System of 1984 (WGS84) coordinate system. These positions are expressed in Earth Centered Earth Fixed (ECEF) coordinates of X, Y, and Z axis. These positions are often transformed into Latitude, Longitude, and Height relative to the WGS84 ellipsoid.

Errors arise in the determined position due to timing/clock errors, intentional introduction of error by the U.S. Air Force (referred to hereinafter as "selective availability" or "S/A") and errors due to atmospheric conditions. Atmospheric models can be used to partially correct for errors due to atmospheric conditions. However, because such corrections are inaccurate, they result in a determination of position that is not highly accurate.

For surveying applications a high degree of accuracy is required in determining position. Therefore, a position determination technique which provides the necessary accuracy by correcting for S/A, and correcting for atmospheric conditions is typically used. One such method is real time kinematic (RTK) position determination.

RTK systems typically include a reference GPS receiver and a roving GPS receiver. The reference GPS receiver receives signals from GPS satellites. Then, either correction data or raw observables data is transmitted to a roving GPS receiver. The roving GPS receiver also receives signals from GPS satellites. The signals received by the roving GPS receiver and the data from the reference GPS receiver are then used to determine the position of the roving GPS receiver with a high degree of accuracy. Typically carrier phase measurements are used to determine position in RTK systems. RTK systems provide a high degree of accuracy provided that the differential separation distance between the reference GPS receiver and the roving GPS receiver is within a predetermined range. However, at very short distances, optical methods are more accurate than RTK methods.

Optical systems are often undesirable for use in a particular survey due to obstructions and terrain contours that prevent direct visual observation of a remote location to be positioned. When obstructions prevent optical measurements or when the distances are so great that optical measurements do not provide the required accuracy, RTK systems are often used.

However, either an optical system or a GPS system alone is usually used to survey a particular location. This requires an advance determination as to which system is to be used each time a survey is to be taken. This process is time consuming and requires an in-depth knowledge of the capabilities and limitations of each system. Also, an in-depth knowledge of the location to be surveyed is required.

What is needed is an apparatus and method for surveying that incorporates the advantages of both optical systems and GPS systems. In addition, a method for accurately determining position is needed that uses both optical measurements and GPS measurements. Furthermore, a surveying system that is easy to use and operate is required.

DISCLOSURE OF THE INVENTION

The present invention provides a system that swiftly and automatically determines which type of data will provide the best survey of a particular site. The best source of position data is then used to determine the desired position.

In one embodiment of the present invention, the seamless surveying system includes a Satellite Positioning System (SATPS) unit, an optical unit and a rover unit. In one embodiment, SATPS signals from satellites of the US Global Positioning System (GPS) are received at the SATPS unit and are coupled to the rover unit. The rover unit includes a target that is adapted to be engaged by the optical unit for optically determining the position of the rover unit. The rover unit includes logic for determining the optimum source of positioning data to be used for determining position. When the seamless surveying system includes a SATPS unit and an optical unit, the rover unit determines whether optical data from the optical unit or SATPS data from the SATPS unit are to be used for determining position.

In one embodiment, the optimum source of position data is chosen based on time. That is, the first received source of position data is determined to be the optimum source of position data. The optimum source of position data is then used to determine position. Thus, when optical data is received first, optical data is used to determine position. Similarly, when SATPS data is received first, SATPS data is used to determine position. This allows for the fastest computation of position.

In another embodiment, the optimum source of position data is chosen based on the distance between the rover unit and the optical system. That is, because optical data give good results at short distances, if both optical data and SATPS data are available, and if the distance is less than a predetermined threshold (the optical threshold), optical data is used. Since SATPS data gives good results at longer distances, SATPS data is used when the distance is greater than or equal to the optical threshold.

In another embodiment, a weighting process is used to determine the optimum source of position data.

In yet another embodiment, the measurements from both the optical unit and the SATPS unit are combined to determine position.

The seamless surveying system of the present invention monitors multiple sources of position data and selects from the available sources of position data the optimum source of position data for a particular application. Therefore, there is no need for the user to determine which type of system to use as is required with prior art systems. Because the determination is automatic, there is no need for human intervention for changing from one system to another. In addition, the seamless surveying system of the present invention is easy to use since data from the optimum source of position data is automatically coupled to the rover unit and is used for accurate determination of position.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 9 is a chart showing an example of weighting variables and weighting factors used to determine the optimum source of position data in accordance with the present claimed invention.

FIG. 11 is a perspective view of one embodiment of the components used for the reference station and mobile station according to the invention.

FIG. 12 is a schematic view of a retro-reflector used at the mobile station or the reference station according to one embodiment of the invention.

FIGS. 13A and 13B together provide a schematic view of a signal processing system used for the reference station and for the mobile station according to one embodiment of the invention.

FIGS. 14A and 14B are front and back perspective views of a conventional electro-optical instrument that determines the horizontal bearing, vertical angle and length of a vector joining this instrument with a second instrument that responds to receipt of an electromagnetic wave from the first instrument by returning a signal to the first instrument.

FIG. 15 illustrates how phase integer ambiguities occur in an SATPS.

FIGS. 16 and 17 illustrate reductions in search volume for the correct carrier phase integers that are available with the invention in two approaches.

BEST MODE FOR CARRYING OUT THE INVENTION

Figure 1:
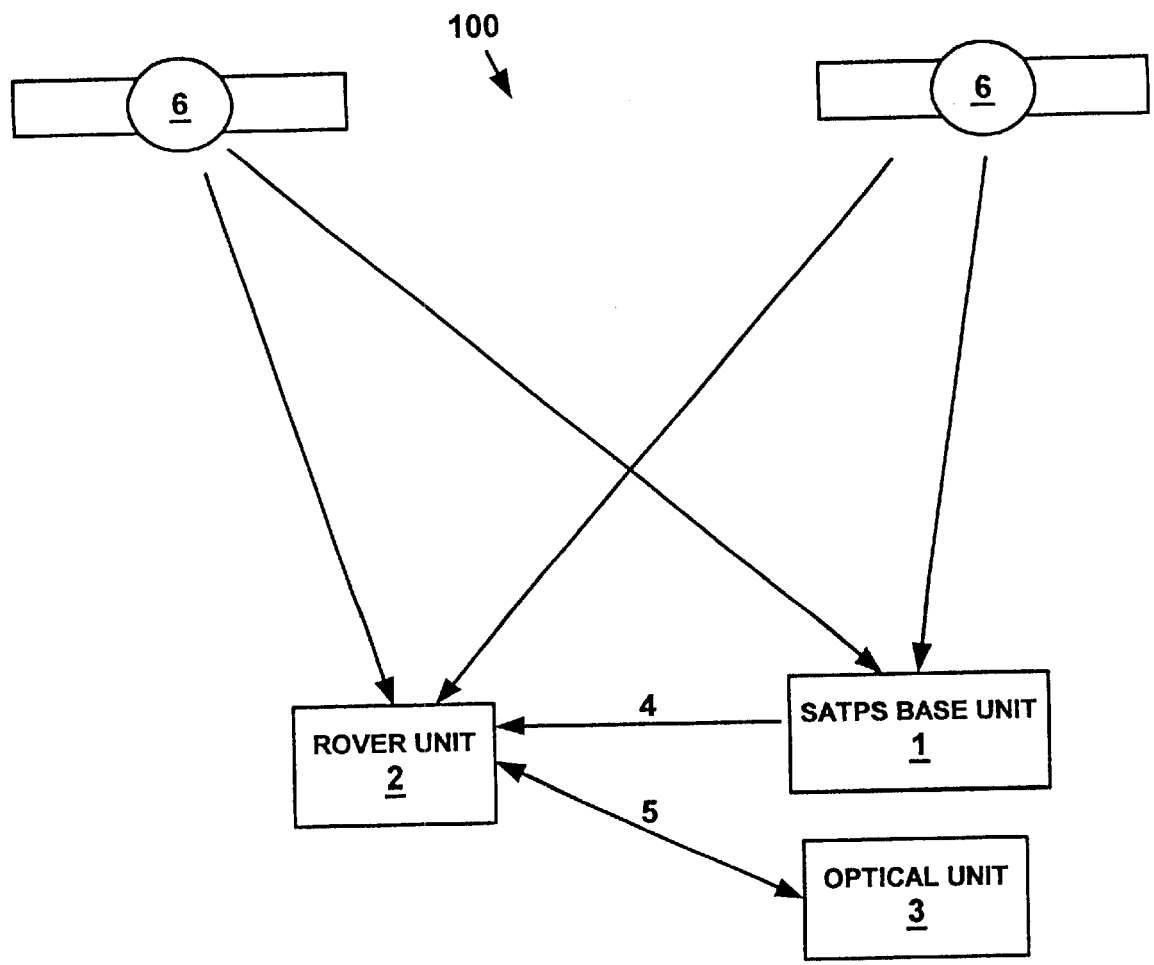
FIG. 1 is a schematic diagram of a seamless surveying system that is receiving signals from satellites of a SATPS in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "incorporating", "calculating", "determining", "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Although the methods and apparatus of the present invention are described with reference to the use of a Satellite Positioning System (SATPS) for determining position, it will be appreciated that the teachings are equally applicable to positioning systems that utilize pseudolites or a combination of pseudolites and satellites. Pseudolites are ground-based transmitters that broadcast a Pseudo Random Noise (PRN) code (similar to a SATPS signal) modulated on an L-band carrier signal, generally synchronized with SATPS time. Typically, each transmitter is assigned a unique PRN code so as to permit identification by a remote receiver. The term "SATPS", as used herein, is intended to include pseudolite or equivalents of pseudolites, and the term "SATPS signals" and "SATPS data", as used herein, is intended to include SATPS-like signals and data from pseudolites or equivalents of pseudolites.

In one embodiment, the SATPS uses satellites of the U.S. Global Positioning System (GPS). However, the methods and apparatus of the present invention are equally applicable for use with other satellite-based positioning systems such as, for example the GLONASS system. The GLONASS system includes satellites that emit signals at slightly different carrier frequencies, with individual satellites identified by the frequency of transmission. Alternatively, signals from other sources such as LORAN, Wide Area Augmentation System (WAAS) satellites, etc. may be used to determine position.

Referring now to FIG. 1, a number of satellites, shown generally as satellites 6 associated with the SATPS transmit their positions in a broadcast mode to all points within their respective fields of view on the earth's surface. Reference stations can determine their positions using the SATPS data directly received from satellites 6 ("uncorrected SATPS data"). Signals received directly from satellites are corrupted by a number of error sources such as, for example, Selective Availability, ephemeris prediction errors, timing errors, and errors in the estimation of ionospheric and tropospheric delay.

Continuing with FIG. 1, in the present invention, a reference station such as SATPS base unit 1 that receives uncorrected SATPS data from satellites 6 and retransmits the uncorrected SATPS data as shown by arrow 4. The transmitted uncorrected SATPS data from SATPS base unit 4 is used by other SATPS receivers such as rover unit 2 to accurately determine position. Methods for determining position using multiple SATPS receivers are well known in the art and include RTK methods that use carrier signals to accurately determine position. However, other methods such as "differential" correction methods may also be used to determine the position of rover unit 2.

Still referring to FIG. 1, in addition to SATPS base unit 4 and rover unit 2, seamless surveying system 100 also includes an optical system such as optical unit 3. Optical unit 3 includes an optical system capable of determining the position of a target. In one embodiment, rover unit 2 communicates with optical unit 3 via a communication link as shown by arrow 5 to indicate that position is to be determined. Optical unit 3 then determines the position of rover unit 2 relative to optical unit 3. Optical data from optical unit 3 is then coupled to rover unit 2.

Figure 2:
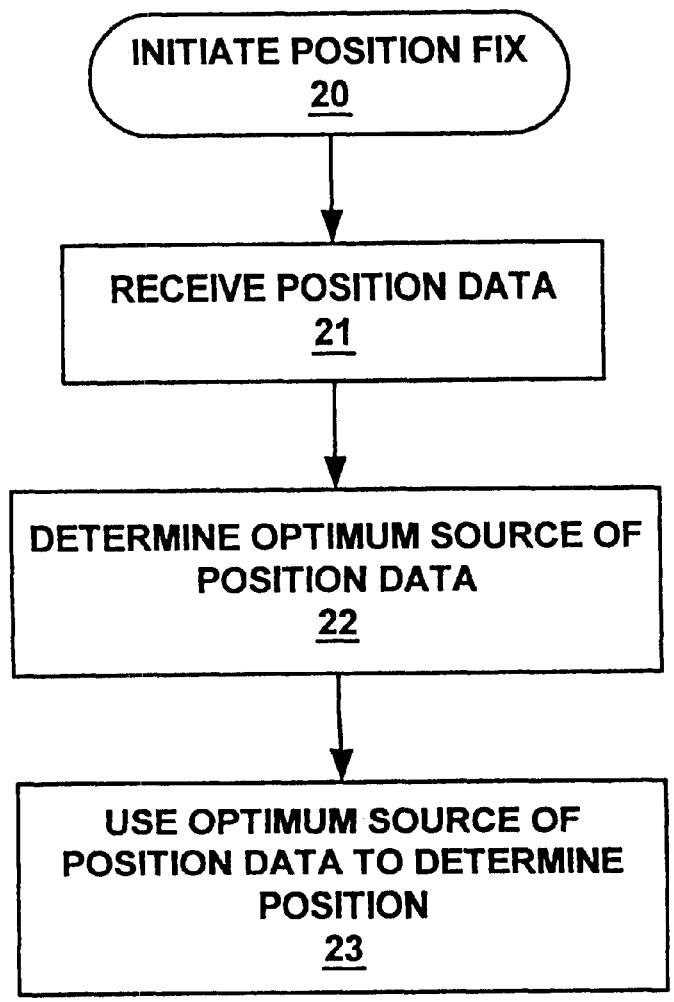
FIG. 2 is a flow chart illustrating a method for determining position that uses the optimum source of position data in accordance with the present claimed invention.

Referring now to FIG. 2, a method for determining position using the optimum source of position data is shown. When a user desires to determine position, the user initiates the position fix as shown by step 20. That is, the user takes some action to start the position determination process.

Figure 3:
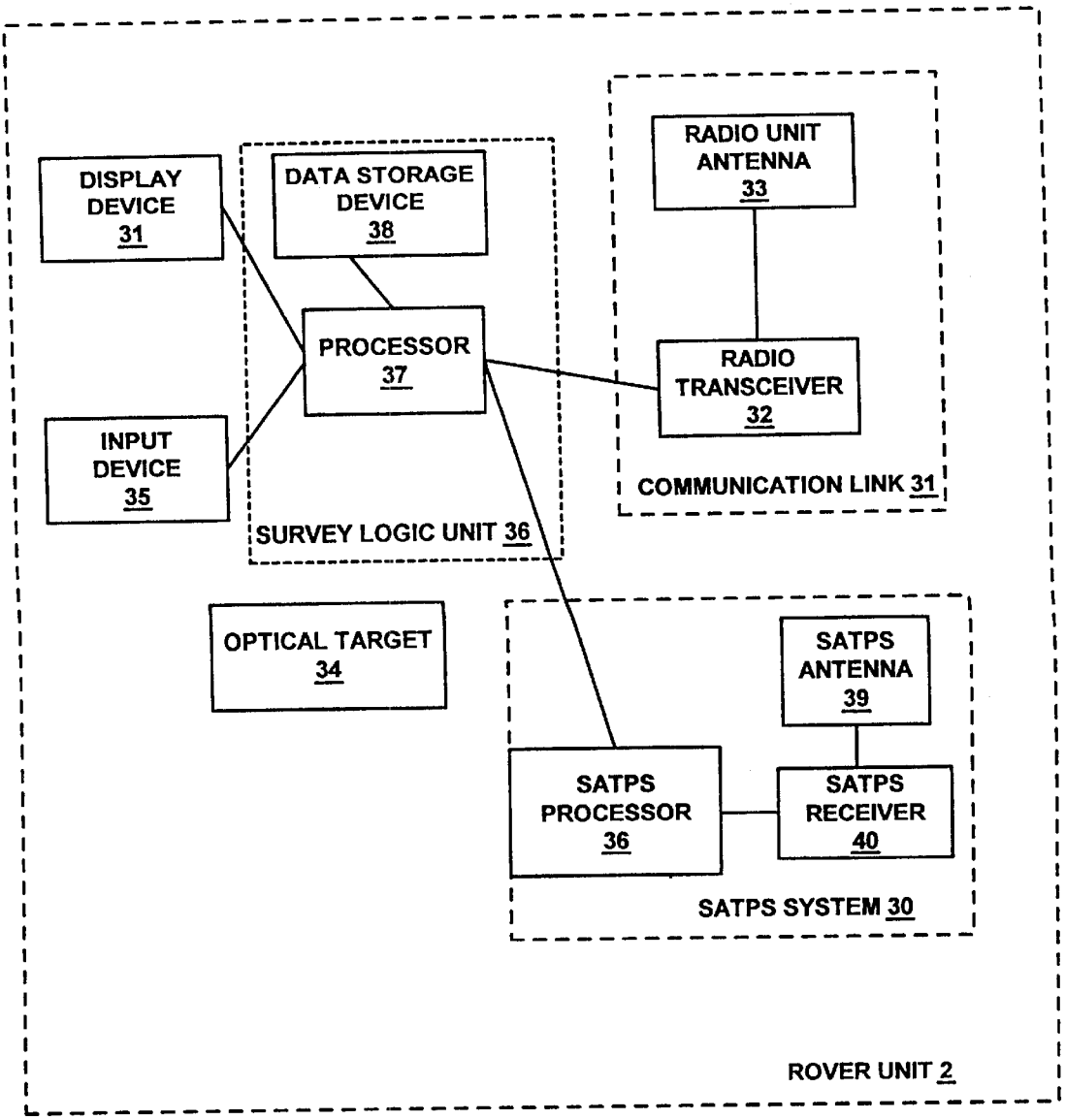
FIG. 3 is a diagram of a rover unit in accordance with the present claimed invention.

Referring to FIG. 3, an embodiment of a rover unit is shown. In this embodiment, rover unit 2 includes an input device 35 that is used to initiate the position fix. In one embodiment input device 35 is a keypad which includes a standard keypad. Alternatively, input device 35 may consist of a touch screen or dedicated function keys. When input device 35 includes dedicated function keys, a position fix is initiated by operating a dedicated function key.

Referring back to FIG. 2, position data is received (step 21) from SATPS sources such as SATPS base unit 1 (FIG. 1) and optical sources such as optical unit 3. The optimum source of position data is then determined as shown by step 22. In one embodiment, the first source of position data to be received is determined to be the optimum source of position data. This allows for the fastest possible determination of position.

In the embodiment shown in FIG. 3, rover unit 2 receives position data via communication link 31. Communication link 31 includes a radio unit antenna 33 and a radio transceiver 32. The received position data can include SATPS data from a SATPS receiver such as SATPS base unit 1 of FIG. 1 and optical data from an optical system such as optical unit 3.

Referring back to FIG. 2, the determined optimum source of position data is then used to determine position as shown by step 23. When SATPS data is used to determine position, position is determined using any of a number of known methods. In one embodiment, position is determined using RTK methods that use carrier signals to accurately determine position.

Figure 4:
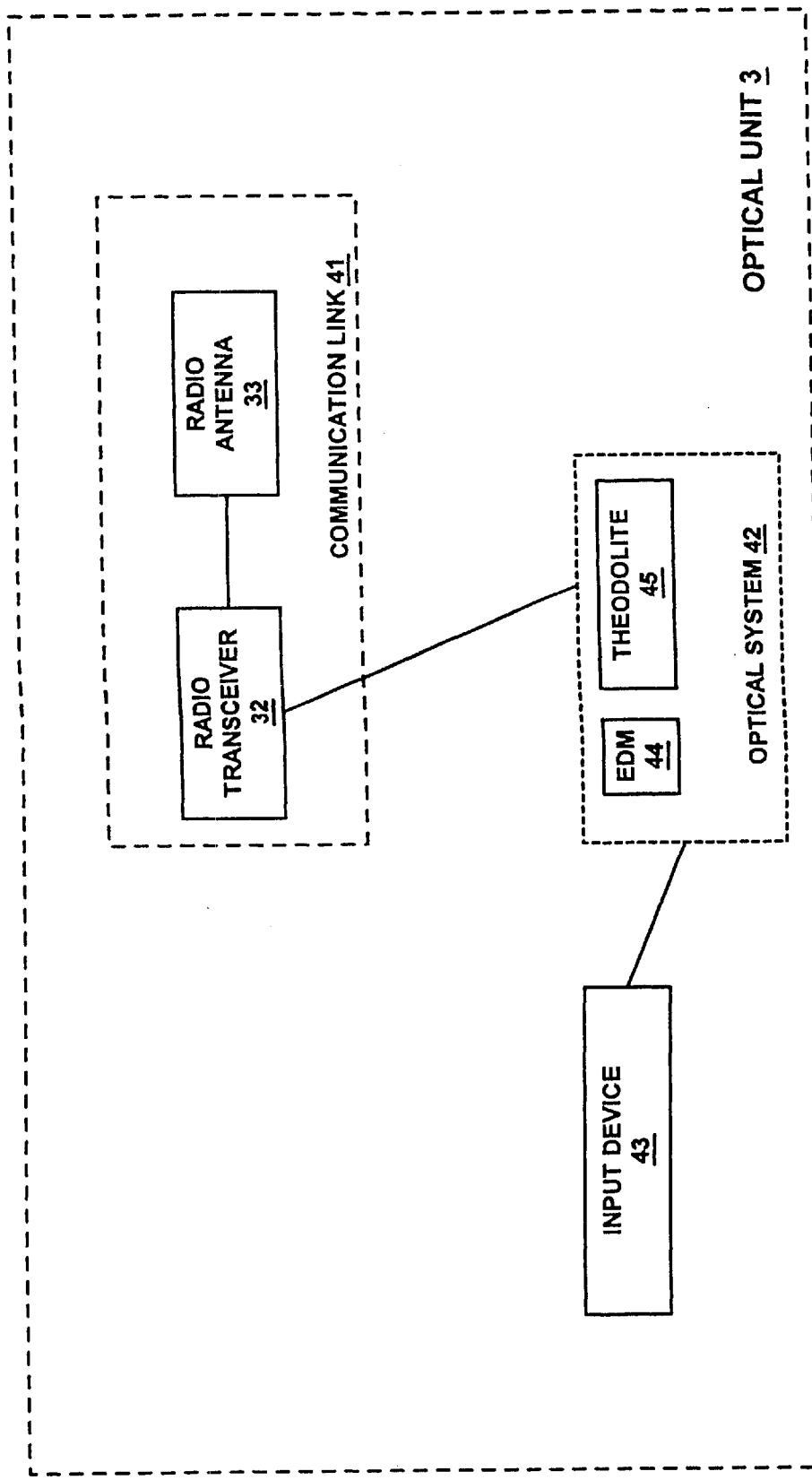
FIG. 4 is a diagram of an optical unit in accordance with the present claimed invention.

FIG. 4 shows an embodiment of optical unit 3 that includes input device 43. In one embodiment, optical unit 3 is placed at a known position and the position of optical unit 3 is manually input using input device 43. Input device 43 may be a standard alphanumeric keypad, or other device for data input. Alternatively, input device 43 is a numeric keypad, a touch screen or dedicated function keys operable in conjunction with a display (not shown).

Upon initiation of a position fix, rover unit 2 communicates with optical unit 3 via communication link 41 of FIG. 4. Communication link 41 includes radio antenna 33 and radio transceiver 32. Upon receiving a signal indicating initiation of a position fix, optical system 42 determines the position of rover unit 2 (FIGS. 1 and 3). This may be done using any of a number of known optical sighting methods. In one embodiment, optical system 42 includes an electronic distance meter (EDM) 44 and a theodolite 45. EDM 44 transmits electromagnetic waves having wavelengths that lie in the near-infrared, infrared, visible or ultraviolet range that are used for determining distance. Theodolite 45 determines horizontal and vertical angles.

In one embodiment, optical target 34 of FIG. 3 is an optical target designed to reflect electromagnetic waves from optical system 42. That is, when EDM 44 transmits electromagnetic waves, optical target 34 of FIG. 3 is a target adapted to reflect electromagnetic waves back toward optical system 42. In one embodiment, optical target 34 of FIG. 3 is an array of antenna components that receive electromagnetic waves and retransmit the received electromagnetic waves at a microwave or infrared frequency. By analysis of the return radiation and the angles measured by theodolite 45, optical system 42 determines the position of rover unit 2. This position is then communicated to rover unit 2 via communication link 41 of FIG. 4. A system for determining position using an EDM and a theodolite is described in U.S. Pat. No. 5,471,218 which is incorporated in part in the following section.

REFERENCED ART (U.S. Pat. No. 5,471,128)

FIELD OF THE INVENTION

This invention relates to surveying and to the use of Satellite Positioning System information to improve the accuracy and productivity of such surveying.

BACKGROUND OF THE INVENTION

As noted by A. Bannister and S. Raymond in Surveying, Pitman Publishing Ltd., London, 1977, general method of surveying was known and practiced more than 2000 years ago. The methods used at that time were simple but subject to consistency errors and required considerable time to perform. Surveying instruments have improved considerably since about 1900, taking advantage of advances in electronics, optics and other related disciplines. Recently, lasers, electro-optics, wave interaction and phase detection have been introduced into, and used in, surveying activities.

Use of a laser beam projector for surveying operations is disclosed in U.S. Pat. No. 3,471,234, issued to Studebaker. The beam rotates over terrain to be surveyed, and a beam point may be directed to a particular location and used to measure elevation and angular displacements within the region covered by the rotating beam.

Altman, in U.S. Pat. No. 3,669,548, discloses a method for determining a ship's heading or bearing, using an electro-optical angle measuring device that determines angles relative to a horizontal datum line. A plurality of parallel light beams, spaced apart by known, uniform distances and oriented at a known angle, forms a one-dimensional grid that covers the region where the ship is located. A rotating reflecting telescope on the ship has its axis aligned with one of the parallel light beams. The angle of the ship's longitudinal axis relative to the known direction of the parallel light beams is then easily read off to determine the ship's heading. This approach would not be suitable where the ship or other body whose angular orientation is to be determined can move over a large region.

Remote measurement of rotation angle of an object of interest by use of polarized light and electro-optical sensors is disclosed by Weiss et al in U.S. Pat. No. 3,877,816. The intensity of light transmitted serially through two linear polarization filters is proportional to the square of the cosine of the angle between the two polarization directions, and the proportionality constant can be determined by experiment. Unpolarized light transmitted along a first reference path with fixed polarization directions is compared with unpolarized light transmitted along a second, spatially separated and optically baffled path in which the polarization direction of one polarizer may vary. One or two light polarizers in each light beam path rotates at a constant angular velocity, which is the same for each path, and the difference in phase of the two received light signals is a measure of the angle of rotation of a polarizer (or the body to which the polarizer is attached) in the first path and a polarizer in the second path.

An optical-electronic surveying system that also determines and displays the angular orientation of a survey pole relative to a local horizontal plane is disclosed in U.S. Pat. No. 4,146,927, issued to Erickson et al. The system can receive and process range measurements directly from an electronic distance meter located near the system.

U.S. Pat. No. 4,443,103, issued to Erdmann et al, discloses use of a retro-reflective, electro-optical angle measuring system, to provide angle measurements after interruption of a signal that initially provided such information. A light beam is split into two beams, which intersect on a scanning mirror, which rotates or vibrates about a fixed axis, and the two beams are received at different locations on a retro-reflective tape positioned on a flat target surface on the target whose rotation is to bemeasured. These two beams form a plane that moves as the scanning mirror moves, with a reference plane being defined by the mirror at rest in a selected position. The scanning mirror sweeps the plane of the two beams across the target surface. A rotation angle of the target surface relative to the reference plane is determined, based upon the time difference between receipt of light from each of the two retro-reflected beams. The beam interception times coincide only if an edge of the retro-reflective tape is parallel to the reference plane. If receipt of light from the two retro-reflected beams is displayed on a synchronized, two-trace oscilloscope screen, the two "blips" corresponding to receipt of these two beams will have a visually distinguishable and measurable time difference $\Delta t$, as indicated in FIGS. 2A, 2B and 2C of the Erdmann et al patent. The time difference $\Delta t$ will vary as the scanning mirror moves. A second Erdmann et al patent, U.S. Pat. No. 4,492,465, discloses a similar approach but with different claims.

"Total station" electronic instrumentation for surveying, and more particularly for measurement of elevation differences, is disclosed by Wells et al in U.S. Pat. No. 4,717,251. A rotatable wedge is positioned along a surveying transit line-of-sight, which is arranged to be parallel to a local horizontal plane. As the wedge is rotated, the line-of-sight is increasingly diverted until the line-of-sight passes through a target. The angular displacement is then determined by electro-optical encoder means, and the elevation difference is determined from the distance to the target and the angular displacement. This device can be used to align a line-of-sight from one survey transit with another survey transit or to a retro-reflector. However, the angular displacement is limited to a small angular sweep, such as 12°.

Fodale et al disclose an electro-optical spin measurement system for use in a scale model airplane wind tunnel in U.S. Pat. No. 4,932,777. Optical targets (six) to receive and sense one or several light beams are located under the fuselage at the nose tip, on each of two sides of the fuselage, and under each wing tip, and a plurality of optical receivers are positioned on the perimeter of the wind tunnel to receive light from the optical targets at various angles, to determine airplane angle of attack and roll angle. The time-synchronized signals received at each receiver are recorded for subsequent analysis.

In U.S. Pat. No. 4,954,833, issued to Evans et al, information on deflection of the local vertical (obtained from gravity measurements) is combined with geodetic azimuth estimated from GPS signals to obtain an astronomical azimuth. This azimuth can be used for ballistic projectile delivery to a selected target. This method does not focus on integration of GPS operation with theodolite operation but, rather, seeks to avoid use of a theodolite to obtain the astronomical azimuth.

Kroupa et al, in U.S. Pat. No. 4,988,189, disclose use of a passive rangefinding system in combination with an electro-optical system, using image information obtained at two or more electro-optical system positions.

A method for simultaneously measuring the difference between orthometric (geoidal) height and height above a given ellipsoid for a site on the Earth's surface is disclosed by Evans in U.S. Pat. No. 5,030,957. Two or more leveling rods are held at fixed, spaced apart locations, with a known baseline vector between the rods. Each levelling rod holds a GPS signal antenna, receiver and processor that determines a GPS location for each rod. The geometric height of the GPS antenna (or of the intersection of the rod with the Earth's surface) is determined for each rod, and the geometric height difference is determined, using standard GPS survey measurements (accurate to within a few centimeters). A comparison of the orthometric height, usually found using a spirit level, and the height above the ellipsoid, obtained from a GPS measurement, provides a measure of the local gravitational field. The patent does not indicate, or perhaps recognize, advantages of use of height information to aid the GPS carrier phase initialization process but treats the GPS and the levelling rods as separate, non-interacting systems.

Ohishi et al disclose an optical distance measuring instrument using light transmitted and returned by retro-reflection in U.S. Pat. No. 5,054,911. A light beam pulse generated at the instrument is split into two pulses; one pulse is immediately received by a laser diode as a reference pulse. The other pulse is transmitted to a retro-reflector at a remote or adjacent target and returned to the instrument by retro-reflection thereat. The returning pulse is received by an optical fiber, having a known time delay $\Delta t$ and then received by the laser diode to provide a second pulse. The time delay $\Delta t$ is subtracted from the difference of arrival times of the two pulses and divided by $2c$ ($c$=ambient medium light velocity) to obtain the distance from instrument to target.

A somewhat unclear disclosure of a beam alignment apparatus and method is presented in U.S. Pat. No. 5,060,304, issued to Solinsky. Two substantially identical beam acquisition apparati are spaced apart from each other, each apparatus including two identical parabolic mirrors with parallel axes, each mirror having an axial aperture through which an electromagnetic wave beam passes and having a second smaller mirror located at the parabola's focal point. Each parabolic mirror has a third mirror consisting of a plurality of small retro-reflectors, located adjacent to but behind the parabolic mirror so that the parabolic mirror lies between the second and third mirrors. One parabolic mirror in each pair receives light from a transmitter positioned behind the mirror aperture and transmits this beam in a direction parallel to the mirror axis. The other parabolic mirror in each pair receives an incident beam propagating parallel to its axis and reflects this light to a receiver located behind the mirror aperture. One of the parabolic mirror pairs is operated in a search mode (moving) at a first selected frequency f1. The second parabolic mirror pair is operated in a "stare" mode at a selected frequency $f2 \neq f1$. As the two mirror pairs come close to alignment with each other, the mirror pairs sense this by receipt of a retro-reflected beam or a directly transmitted beam, the distinction being made by the frequency of the beam received. The search mode mirror pair, and then the stare mode mirror pair, can then be brought into alignment with each other.

A surveying instrument that uses GPS measurements for determining location of a terrestrial site that is not necessarily within a line-of-sight of the surveyor is disclosed in U.S. Pat. No. 5,077,557 issued to Ingensand. The instrument uses a GPS signal antenna, receiver and processor, combined with a conventional electro-optical or ultrasonic range finder and a local magnetic field vector sensor, at the surveyor's location. The range finder is used to determine the distance to a selected mark that is provided with a signal reflector to return a signal issued by the range finder to the range finder. The magnetic field vector sensor is apparently used to help determine the surveyor's location and to determine the angle of inclination from the surveyor's location to the selected mark.

U.S. Pat. No. 5,101,356, issued to Timothy et al, discloses a moving vehicle attitude measuring system that mounts three GPS signal antennas in a non-collinear configuration on the vehicle at predetermined distances from each other. Each antenna is connected to a GPS receiver/processor. The phases of rf signals arriving at the antennas are compared to determine the angular orientation of the plane containing the three antennas, and the angular orientation of the vehicle that carries these antennas.

Method and apparatus for measuring the relative displacement of two objects, applicable to monitoring of movement of adjacent material along an earthquake fault, is disclosed in U.S. Pat. No. 5,112,130, issued to Isawa. First and second optical distance measuring instruments (ODMIs) are placed at known locations astride a selected line (e.g., a fault line). First and second optical reflectors, also astride the selected line, are spaced apart by known distances from the first and second ODMIs. Distances from the first ODMI to the second reflector and from the second ODMI to the first reflector are measured ab initio and compared with subsequent readings of these two distances. If one or both of these distances changes, the magnitudes of the changes are used to determine how far the Earth on one side of the line has moved relative to the Earth on the other side of the line, as might occur in a slip along a fault line.

Ghaem et al disclose an electronic direction finder that avoids reliance on sensing of terrestrial magnetic fields for establishing a preferred direction for satellite signal acquisition in U.S. Pat. No. 5,146,231. The apparatus uses a receiver/processor for GPS or similar navigation signals received from a satellite, and requires (stored) knowledge of the present location of at least one reference satellite from which signals are received. The orientation of the finder or its housing relative to a line of sight vector from the finder to this reference satellite is determined. This orientation is visually displayed as a projection on a horizontal plane. Any other direction in this horizontal plane can then be determined with reference to this projection from a knowledge of the reference satellite location.

U.S. Pat. No. 5,142,400, issued to Solinsky, discloses a method for line-of-sight acquisition of two optical beam transceivers suitable for use in satellite communications. A first beam transceiver has an optical retro-reflector and initially operates in a passive or "stare" mode, with its beam transmitted in a fixed direction. A second transceiver performs a search over $2\pi$ steradians with its optical beam until it receives, from the first transceiver, either (1) a return of its own beam or (2) a distinguishable beam from the first transceiver. Boresight alignment is then maintained after beam-to-beam acquisition.

U.S. Pat. No. 5,146,290, issued to Hartrumpf, discloses apparatus for determining the position and angular orientation of an object. A partially silvered hemispherical light reflector is fixed to some part of the object, and two spaced apart laser beams are directed to intersect at the hemisphere center, to be (partly) retro-reflected at the hemisphere reflector surface, and to return toward the laser sources, to be detected by photodetectors located adjacent to each laser source. A portion of the beam from each laser source is transmitted through the hemispherical reflector and is received by a line or plane of photodetectors positioned on a plane behind the hemispherical reflector. As the object is translated or rotated, the locations where the reflected and transmitted beams are received by the photodetector arrays changes in a manner that can be related to the translation and/or rotation of the object.

A theodolite and tape have traditionally been used to measure horizontal and vertical angles and distances in terrestrial surveying. Recently, digital theodolites, as described in U.S. Pat. No. 3,768,911, issued to Erickson, and electronic distance meters (EDMs), as described by Hines et al in U.S. Pat. No. 3,778,159, have supplanted the theodolite and tape approach. Combination of an optical angle encoder and an EDM in an integrated package (called an "electronic total station"), as disclosed in U.S. Pat. No. 4,146,927, issued to Erickson et al, has led to automation of field procedures, plan production and design work.

Several limitations exist in use of a conventional total station. First, it is difficult to quickly establish the angular orientation and absolute location of a local survey or datum. Many surveys are not related to a uniform datum but exist only on a localized datum. In order to accurately orient a survey to a global reference, such as astronomical north, a star observation for azimuth is often used that requires long and complicated field procedures. Second, if a survey is to be connected to a national or state geodetic datum, the survey sometimes must be extended long distances, such as tens of kilometers, depending upon the proximity of the survey to geodetic control marks. Third, the electronic total station relies upon line-of-sight contact between the survey instrument and the rodman or pole carrier, which can be a problem in undulating terrains.

These systems do not provide the benefits of an integrated SATPS and terrestrial total station instrument. What is needed is a system that provides: (1) rapid azimuth and location determination in a fixed reference frame; (2) prompt resolution of the carrier phase ambiguities that occur in a SATPS; (3) distance and angle information without requiring line-of-sight contact between a reference station and a mobile station; (4) fail-safe capability for crosschecking, and calibrating the respective error sources in, the location information provided by the SATPS and by the terrestrial positioning system; and (5) capability for accounting for height differences between the geoid and ellipsoid over the local survey area.

SUMMARY OF THE INVENTION

These needs are met by the invention, which provides a surveying system that combines Satellite Positioning System (SATPS) techniques with new and with known survey techniques. The apparatus includes a first or reference station that provides a reference for the survey and whose location is determined with high accuracy, and a second or mobile station that is spaced apart from the first station and acts as a mobile measurement unit for the survey. More than one mobile station can be used simultaneously with one reference station. The reference station includes a first Satellite Positioning System (SATPS) antenna and first SATPS receiver/processor, connected together, for receiving SATPS signals from two or more SATPS satellites and for determining the location of the reference station according to the SATPS signals. The first SATPS receiver/processor is adapted for determining the difference, if any, between the location, known with high accuracy, of the reference station and the location of the reference station as determined by the SATPS satellite signals. The reference station also includes a reference station communications antenna, connected to the first SATPS receiver/processor, for transmitting or receiving station location and point attribute information. The reference station also includes an electronic distance meter (EDM) and digital theodolite, whose spatial orientation can be varied arbitrarily, connected to the first SATPS receiver/processor, for transmitting electromagnetic waves having a selected wavelength and for determining the distance from the reference station to the mobile station by receipt of a return electromagnetic signal from the mobile station, for determining the elevation difference, if any, between the reference station and the mobile station, and for determining the angular displacement between a line drawn between the reference station and the mobile station and a selected reference line.

The mobile station includes a second Satellite Positioning System (SATPS) antenna and second SATPS receiver/processor, connected together, for receiving SATPS signals from two or more SATPS satellites and for determining the location of the mobile station according to the SATPS signals. A second station communications antenna, connected to the second SATPS receiver/processor, for communicating with the reference station communications antenna and for transmitting to the reference station a signal containing feature and attribute information and information on the location of the mobile station as determined by the SATPS satellite signals, is also included in the mobile station. The mobile station also includes an electronic distance meter responder, adapted to receive the electromagnetic waves transmitted by the electronic distance meter and to provide a return electromagnetic signal that is received by the electronic distance meter at the reference station. The reference station communication means and the mobile station communication means are connected by a data link for transferring information from one station to the other station.

The invention provides a "total SATPS station", including first and second spaced apart SATPS station; whose relative separation is determined with high accuracy, as a supplement to survey equipment. Each of the first and second SATPS stations includes an SATPS antenna and SATPS receiver/processor that receive signals from two or more SATPS satellites and process these signals to partly or fully determine the position of the SATPS antenna. The first and second SATPS antenna and associated SATPS receiver/processor may be retrofitted within first and second housings, respectively, that contain conventional first and second electro-optical survey instruments, respectively, used to determine the beating, length of, and/or height difference of a separation vector joining the two electro-optical survey instruments.

The invention uses certain electro-optical survey measurements, implemented by use of one or more: signal retro-reflectors that operate in the microwave, infrared, visible or ultraviolet wavelength ranges, to determine the bearing, length of, and/or height difference of a separation vector joining the first and second stations. This requires that the two stations have line-of-sight visual contact. The primary object is to implement carder phase positioning (accurate to within a few centimeters), or the less accurate code phase positioning, using the SATPS satellite signals. Carrier phase positioning is implemented by causing two or more SATPS stations track a common group of SATPS satellites. The measurements are then merged and either processed in real time, or postprocessed, to obtain data useful in determination of the location of any stationary or mobile SATPS station adjacent to an SATPS reference station. Real time positioning requires transfer of SATPS data between a reference station and a mobile station, using a data link that need not rely upon line-of-sight communication.

One problem that must be overcome initially in use of carrier phase positioning is the presence of phase integer ambiguities in the carrier phase measurements for the tracked satellites. An integer search technique for identification of the phase integers often takes account of the statistical nature of discrete integer combinations that are realistic candidates for the proper phase integers. The number of possible combinations to be searched is enormous, unless the number of candidates can be reduced ab initio. If the relative location of two SATPS stations is known precisely, the number of initial phase integer combination candidates can be reduced to as few as one. If the horizontal or vertical separation distance between the two stations is known with high accuracy in the SATPS frame, the number of phase integer combination candidates can be reduced to a modest number that can be searched relatively quickly and can reliably produce the correct results. The number of phase integer combination candidates is reduced by sequentially applying position information provided by the electro-optical survey measurements Another serious problem with carrier phase positioning is the possibility of SATPS signal interruptions at one or both SATPS stations. When a SATPS satellite signal is lost, the phase integer(s) must be redetermined. Signal interruption can easily occur in urban or other built-up areas where tall structures interfere with or produce multipath SATPS signals. A separation vector between two SATPS stations, specified by three coordinate differences, or by a vector magnitude and two or more spherical angles relative to a fixed direction, may be known initially. However, one or both of these stations may have moved when the signal is interrupted so that the separation vector must be established again.

The invention provides a separation vector, between the two stations by use of one or more wave retro-directors that are mounted on the second station and facing the first station. An electromagnetic wave beam ("light beam") is directed from the first station toward the second station, and the beam is retro-reflected from the second station toward the first station. The station-to-station separation vector is obtained by electro-optical phase measurement techniques. Once the separation vector is re-established, after an SATPS signal interruption occurs, the phase integer combination for the two station is promptly redetermined, and static or kinematic surveying can continue.

Several benefits accrue from this total station approach: (1) rapid azimuthal angle determinations can be made; (2) use of differential SATPS information supplements and improves the accuracy of the survey parameters that can be measured; (3) SATPS signal processing can be done at the reference station or at the mobile station; (4) where the frequency of the station-to-station data link is selected appropriately, or where one or more signal repeaters are used to relay signals between the two stations, survey measurements are not limited to line-of-sight measurements from reference station to a mobile station, once the phase integer ambiguities are resolved; and (5) systematic and random errors in the SATPS and electro-optical measurements can be determined and reduced by combining the information from the two systems.

BRIEF DESCRIPTION OF THE DRAWINGS

FIG. 11 is a perspective view of one embodiment of the components used for the reference station and mobile station according to the invention.

FIG. 12 is a schematic view of a retro-reflector used at the mobile station or the reference station according to one embodiment of the invention.

FIGS. 13A and 13B together provide a schematic view of a signal processing system used for the reference station and for the mobile station according to one embodiment of the invention.

FIGS. 14A and 14B are front and back perspective views of a conventional electro-optical instrument that determines the horizontal bearing, vertical angle and length of a vector joining this instrument with a second instrument that responds to receipt of an electromagnetic wave from the first instrument by returning a signal to the first instrument.

FIG. 15 illustrates how phase integer ambiguities occur in an SATPS.

FIGS. 16 and 17 illustrate reductions in search volume for the correct carrier phase integers that are available with the invention in two approaches.

DESCRIPTION OF BEST MODE OF THE INVENTION

FIG. 11 illustrates many of the components included in a reference station 1111 and a mobile station 1131 according to one embodiment of the invention. The reference station 1111 includes a plate 1113 mounted on a tripod or other stable structure (not shown) and rotatable about an approximately vertical first axis AA that passes through the plate 1113. A second body 1115, referred to as the alidade, is mounted on a top surface of the plate 1113 and is either rotatable about the first axis AA with respect to the plate 1113 or rotates with the plate 1113 about the first axis AA. A third body 1117 is positioned adjacent to or surrounded by the alidade 1115 and rotates about an approximately horizontal second axis BB, referred to as the trunnion or horizontal axis, with respect to the alidade 1115. The third body 1117 includes an EDM 1119 that may be aimed or pointed in an arbitrary direction (over a hemisphere with included solid angle approximately $2\pi$ steradians) with the aid of rotations of the first, second and third bodies about the first and second axes AA and BB. In one embodiment, the EDM 1119 relies upon electro-optical principles and emits electromagnetic waves W with a fixed wavelength $\lambda$ that is known to high accuracy. The waves W are reflected at, or otherwise interact with, the mobile station 1131, and a return signal from the mobile station is used to determine the distance from the reference station 1111 to the mobile station 1131.

The reference station 1111 determines the horizontal or azimuthal angle $\theta_h$ of a reference station orientation line DD in the local horizontal plane with respect to a fixed reference line RR (shown in FIG. 6 for improved clarity), such as true north. The reference station 1111 also determines the vertical or polar angle $\theta_v$ between the horizontal line DD and a separation vector SV (of length d) that joins the reference station and the mobile station 1131.

The reference station 1111 further includes an SATPS signal antenna 1121, which may form part of a handle or other structure for the instrument 1111, that receives SATPS signals from two or more satellites that are part of a Satellite Positioning System. The SATPS signals received by the SATPS antenna 1121 are passed to an SATPS receiver/processor 1123 that analyzes these signals and determines the location of the antenna. The SATPS signal receiver/processor 1123 (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in The NAVSTAR Global Positioning System, Van Nostrand Reinhold, 1992, pp. 33–90, incorporated by reference herein.

The reference station 11 also includes a first station communication means, including a first transmitter, receiver or transceiver 1124 and first communications antenna 1125, for transmitting information to and/or receiving information from the mobile station 1131, and a common data output port 1127.

The mobile station 1131 includes a fourth body 1133 that is mounted on a tripod, prism pole or other stable structure (not shown) and is rotatable about an approximately vertical third axis CC. Normally, the axes AA and CC are each aligned to the local gravitational force vector so that AA and CC are parallel to each other only for very small separations between the reference station 1111 and the mobile station 1131. The fourth body 33 includes an EDM responder 1135 that responds to incident electromagnetic waves, such as W, and produces a return signal that is received and understood by the EDM 1119. The EDM 1119 and the EDM responder 1135 work cooperatively to determine the distance or range from the reference station 1111 to the mobile station 1131 and/or an angle between the station separation vector SV and a selected reference line, such as a true northline passing through the reference station. The azimuthal angle (horizontal) and polar angle (vertical) for the separation vector SV are determined using an optical encoder that is included in the digital theodolite.

The mobile station 1131 also includes a second SATPS signal antenna 1137 and a second SATPS signal receiver/processor 1139, connected together, that also receive SATPS signals from two or more SATPS satellites and determine the location of the second SATPS antenna from these SATPS signals. The mobile station 1131 may include a common data output port 1138 for first or second station location information.

The mobile station 1131 also includes a second transmitter, receiver or transceiver 1140 and second communications antenna 1141 that allows communication between the reference station 1111 and the mobile station 1131. In one mode of operation of the system shown in FIG. 1, the reference station 1111 receives SATPS signals, makes code phase and/or carrier phase measurements, compares the location of the reference station indicated by these signals with the location of the reference station that is known with high accuracy from another source, and transmits location correction information to the mobile station 1131. This information may include the unprocessed code phase and/or carrier phase information plus corrections to the SATPS-determined reference station location, based upon the known reference station location.

The reference station 1111 determines the difference in three location spatial coordinates and/or a local time coordinate and transmits these coordinate differences to the mobile station, using the first and second communications antennas 1125 and 1141. The mobile station 1131 then uses the reference station measurements and mobile station location information, plus the local SATPS measurements, to accurately determine the location of the second SATPS antenna 1137 relative to the location of the first SATPS antenna 1121. Alternatively, in a second mode of operation, the mobile station 1131 transmits its SATPS-determined location carrier wave attribute or pseudorange attribute and/or time coordinates and height of instrument and relevant status information (such as meteorological data and remaining battery charge) to the reference station 11, using the first and second communications antennas 1125 and 1141. The first SATPS receiver/processor 1123 receives these coordinates and corrects the coordinates for the second SATPS antenna 1137, using the measurements for the first SATPS antenna 1121.

In a third mode of operation, the reference station 1111 receives SATPS data from a remote station (not shown in FIG. 11) whose location is precisely known in a geodetic reference frame. The reference station 1111 uses this information to precisely determine its own location and the location of the mobile station 1131 in the desired reference frame.

FIG. 12 illustrates one suitable EDM responder 1135 for the mobile station 1131 in FIG. 11, an electromagnetic wave retro-reflector 51 that includes two highly reflective surfaces 1153a and 1153b that are oriented perpendicularly to each other. Alternatively, the retro-reflector 1151 may include an array of antenna components 1153a and 1153b that receives an incident electromagnetic wave at a microwave or infrared frequency and produces a retro-directed wave that proceeds away from the retro-reflector 1151 in the opposite direction, as illustrated in U.S. Pat. No. 4,985,707, issued to Schmidt and Kadim, incorporated by reference herein.

An incident electromagnetic wave W1 approaches the first surface/array 53a at an arbitrary incidence angle $\phi1$, is reflected as a wave W2 that approaches the second surface/array 1153b, and is reflected by this second surface/array as a wave W3 at a reflectance angle $\pi/2-\phi1$. The wave W3 thus moves away from the retro-reflector 1151 in the same direction as, but oppositely directed to, the direction of approach of the incident wave W1. The incident wave W1 is thus returned toward the EDM 1119 in FIG. 1 as an anti-parallel wave W3. The EDM responder 35 in FIG. 11 may be an optical retro-reflector of well known design if the incident electromagnetic wave W1 has a wavelength that lies in the near-infrared, visible or ultraviolet range. If the incident wave W1 has a far-infrared or microwave or longer wavelength, the EDM responder 1135 may be an array of antenna elements for retro-direction of the incident wave, as indicated above.

FIGS. 13A and 13B illustrate one embodiment of the system 1161 of the reference station 1111 and of the system 1171 of the mobile station 1131, respectively. The reference station system 1161 includes: (1) an SATPS measurement subsystem 1162 that receives SATPS satellite signals and computes or otherwise determines or computes the SATPS-determined location of the first SATPS antenna 1121 (FIG. 11); (2) a total station subsystem 1163 that includes the EDM 1119 and provides horizontal and/or vertical distance and/or angular displacement information and/or azimuthal displacement information for the mobile station 1131 relative to the reference station 1111; (3) a data link subsystem 1164 that receives SATPS location information from and/or transmits SATPS location information from the mobile station 1131; (4) a data processing subsystem 1165 that receives information from the subsystems 1162, 1163 and/or 1164 and provides information on the location of the mobile station 31 relative to the reference station 1111; and (5) a user interface subsystem 1166 that receives information from the data processing subsystem 1165 and displays and stores this information in a useful format or formats for a person performing survey activities at the reference station 1111.

The mobile station system 1171 shown in FIG. 3 includes: (1) an SATPS measurement subsystem 1172 that receives SATPS satellite signals, makes carrier phase and code phase measurements, and determines the SATPS-determined location of the second SATPS antenna 1137 (FIG. 1); (2) a data link subsystem 1173 that receives SATPS location information from and/or transmits SATPS location information from the reference station 1111; (3) a voice message and/or data link 1174 (optional) that connects the reference station data link subsystem 1164 with the mobile station data link subsystem 1173 and allows the operators at the two stations to communicate with each other; (4) a data processing subsystem 1175 that receives information from the subsystems 1172 and/or 1173 and/or 1176 and provides information on the location of the mobile station 1131; and (5) a user interface subsystem 1176 that receives information from the data processing subsystem 1175 and displays and stores this information in a useful format or formats for a person performing survey activities at the mobile station 1131.

The data link element 1173 shown in FIG. 3B may be implemented in several ways. A first implementation introduces modulation into the optical wave or radiowave W used for sighting of the mobile station 1131 from the reference station 1111 (FIG. 1). With reference to FIG. 12, if the wave W1 is optical, the reflecting surfaces 1153a and 1153b are provided with electrically sensitive backings 1155a and 1155b, respectively, that sense these modulations on the optical wave W1 and transfer these sensed modulation signals to a signal demodulator 1157 that demodulates and determines the content of these signals. Because the incident wave W1 and first reflected wave W2 will be intercepted by the respective reflectors 1153a and 1153b, each of the two sensitive backing layers 1155a and 1155b should sense substantially the same modulated signal; and either or both of these sensed modulation signals can be used by the demodulator 1157. As one alternative, the modulation signals sensed by the sensitive backing layer 55b can be used as an error check for the modulation signals sensed by the sensitive backing layer 1155a. If the wave W1 is a radiowave, the modulations introduced into the wave W1 can be sensed by one or more of the antenna elements in the retro-directing antenna array and, again, demodulated by a signal demodulator.

A second implementation of the data link 1173 shown in FIG. 3B uses a radio link established by the antennas 1125 and 1141 and associated transmitters and receivers 1124 and 1140, as illustrated in FIG. 11. This data link has the advantage that the link can provide one-way or two-way communication between the reference station 1111 and the mobile station 1131.

At least three approaches can be adopted for data receipt and processing in the embodiment shown in FIGS. 13A and 13B. In a first approach, the mobile station system 1171 receives the SATPS signals (including satellite attributes information) through its SATPS measurement subsystem 1172 and transmits these signals to the reference station system 1161, where the SATPS-determined locations of the reference station and of the mobile station are computed, the reference station location correction (=known reference station location-SATPS-determined reference station location) is computed, and the SATPS-determined mobile station location is corrected using the reference station location correction. In this approach, the data processing subsystem 1175 and the user interface subsystem 1176 in the mobile station system 1171 are optional and can be deleted.

In a second approach, the reference station system 1161 receives the SATPS signals through its SATPS measurement subsystem 1162 and transmits these signals to the mobile station system 1171, where the SATPS-determined locations of the reference station and of the mobile station are computed, the reference station location correction is computed, and the SATPS-determined mobile station location is corrected using the reference station location correction. The known location of the reference station can be transmitted from the reference station to the mobile station, or this known location information can be stored in the SATPS measurement subsystem 1172 or the data processing subsystem 1175 of the mobile station system 1171. In this approach, the data processing subsystem 1165 and the user interface subsystem 1166 in the reference station system 1161 are optional and can be deleted.

In a third approach, the mobile station system 1171 receives the SATPS signals through its SATPS measurement subsystem 1172, determines the mobile station location, and transmits the SATPS-determined mobile station location information to the reference station system 1161. At the reference station system 1161, the SATPS-determined reference station location is computed, the reference station location correction is computed, and the SATPS-determined mobile station location is corrected using the reference station location correction. In this approach, the user interface subsystem 1176 in the mobile station system 1171 is optional and can be deleted.

FIGS. 14A and 14B are front and back views, respectively, of a representative conventional electronic total station 1181 from the prior art. The front view in FIG. 4A illustrates a carrying handle 1183, instrument height mark 1185, electronic memory card and cover 1187, alphanumeric display 1189, clamps 1191 and 1193, circular level 1195 with associated level adjusting screws 1197, level adjusting foot screws 1199, Tribach 9101, horizontal circle positioning ring 9103, keyboard 9105 for data and instruction entries, an objective lens 9107 for survey line-of-sight positioning, and a base plate 9109. The back view (operator side) of the station 1181 in FIG. 14B illustrates a slot for a tubular compass 9113 in the handle 1183, a battery or other power supply 9115, an optical plummet focusing ring 9117 and focusing eyepiece 9118, a power switch 9119, a horizontal clamp 120, a vertical clamp 121, a horizontal fine motion adjustment screw 9122, a data output electronic connector 9123, an external power supply connector 9125, a horizontal plate level 9127 and adjusting screw 9129, a vertical fine motion adjustment screw 9131, a telescope transitting knob 9133, a telescope eyepiece 9135 (connected with the objective lens 9107 in FIG. 14A), a telescope focussing ring 9137, and a peep sight 9139 for further viewing of a scene in which a survey measurement will be made.

SATPS carrier phase measurements contain an integer phase ambiguity that must be resolved to obtain centimeter-level accuracies on station location. FIG. 15 illustrates two intersecting wavefront sequences arising from carrier waves received from two SATPS satellites, the actual location MS of a mobile station antenna 1137, and several adjacent other candidates MSC for the mobile station location. An EDM and digital reading of vertical slope between the reference and mobile stations provides valuable information for resolution of these integer phase ambiguities. The known distance d shown in FIG. 16 between the reference station antenna 1121 and the mobile station antenna 1137 limits the integer search region for the integer phase ambiguities to a sphere of radius d. In practice the distance d will be known only within a small uncertainty±Δd, and the search region becomes a volume between two concentric spheres of radius d±Δd.

The search region is further reduced by applying the known height difference $d_v$ between the two antennas 1121 and 1137, which is determined from knowledge of the distance d and the vertical angle $\theta_v$ relative to a horizontal line DD in FIG. 16. In practice, the vertical angle $\theta_v$ will have a small uncertainty±$\Delta\theta_v$ associated with it. The search can now be limited to an annular region defined by intersection of the two concentric spheres of radius d±Δd and the region between two cones having a common apex at the reference station antenna 21 and apex angles equal to $\pi/2-(\theta_v\pm\Delta\theta_v)$. An angular displacement $\theta_h$ between a reference line RR and the line DD can used to re-establish lost satellite lock.

The height difference between the reference and mobile stations 1111 and 1131 are related to the geoid, while the SATPS measurements are related to a fixed ellipsoidal reference system. Unless the coordinate differences between the geoid system and this reference system have been determined beforehand, the antenna height difference $d_v$ must also take account of the uncertainties, if any, in the geoid-ellipsoid reference systems. As long as the separation distance d is small (≦10 km), the geoid-ellipsoid height difference should be no more than a few centimeters in reasonably flat terrain. The integer search region might be approximated by an ellipsoid, as in FIG. 16, or by a curvilinear parallelepiped, as in FIG. 17.

Further reduction in the integer search region may be realized by taking advantage of the available differential SATPS code measurements, which provide an unambiguous estimate of the mobile station location relative to the reference station, with an inaccuracy of no more than about five meters. The accuracy of the code-based location solution governs the resulting size of the integer search region, which is now reduced to a sector of the ellipse of revolution, as illustrated in FIG. 16. Only those carrier phase integer ambiguity combinations that fall within the sector indicated in FIG. 16 are considered as candidates. The integer combination with the smallest dispersion is preferably chosen as the correct combination. If the correct integer combination is not immediately apparent from a single measurement epoch, additional satellite geometries over the course of time may be used to average out errors and to further eliminate incorrect integer combinations.

One of the first references to discuss ambiguity resolution techniques in a GPS context is Counselman and Gourevitch, "Miniature Interferometer Terminals for Earth Surveying: Ambiguity and Multipath with Global Positioning System", I.E.E.E. Trans. on Geoscience and Remote Sensing, vol. GE-19 (1981) pp.24414 252, incorporated herein by reference. The published search algorithms rely on a statistical measure of the quality of different ambiguity integer combinations, in order to identify the correct ambiguities for the tracked satellites.

Some computational efficiencies have been incorporated in integer search algorithms disclosed by Hatch in U.S. Pat. Nos. 4,963,889 and 5,072,227, and by Euler and Landau in "Fast GPS Ambiguity Resolutions On-the-fly for Real-time Applications", Sixth International Geodetic Symposium on Satellite Positioning, Columbus Ohio, Mar. 17–20 1992, incorporated by reference herein. Search techniques for ambiguity integers have also been disclosed where the distance between two SATPS receivers (e.g., at reference and mobile stations) is known. The Hatch patents, U.S. Pat. No. 5,101,356, issued to Timothy et al, and U.S. Pat. No. 5,148,179, issued to Allison, incorporated by reference herein, discuss other techniques for resolution of integer ambiguities. The capability of tightly constraining the integer ambiguity search based upon height difference and separation distance of two SATPS antennas is particularly valuable here. Thus, several techniques exist for resolution of integer ambiguities, and such techniques can be applied here in performing carrier-phase positioning in the context of this invention.

An SATPS antenna, receiver/processor and other appropriate equipment can be retrofitted to, and even integrated into the housing for, the conventional electronic total station 1181 shown in FIGS. 14A and 14B. For example, an SATPS antenna 1121 of appropriate design and SATPS receiver/processor 1123 can be incorporated in the top of the handle 1183 in FIG. 14A, as suggested in FIG. 11. Alternatively, the SATPS receiver/processor can be positioned in 1115 of FIG. 11 at any convenient place therein. A second antenna 1125 and transceiver 1124 for the reference station 1111 and a second antenna 1141 and transceiver 1140 for the mobile station 1131 can be positioned at any convenient places on those stations, for communicating with each other. Preferably, the SATPS components and related communications components 1121, 1123, 1124 and 1125 on the reference station 1111 should share a common data port and a common power supply connector with the other reference station components; and the SATPS components and related communications components 1137, 1139, 1140 and 1141 for the mobile station 1131 should share a common data port and a common power supply connector with the other mobile station components.

A configuration of two or more receivers can be used to accurately determine the relative positions between two stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

This invention herein relies upon a combination of differential satellite positioning system (DSATPS) and electro-optical distance and angle measurements to provide highly accurate position information on the location of one or more mobile stations relative to a reference station whose location is known or determined with high accuracy.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55.degree. relative to the equator and being separated from each other by multiples of 60.degree. longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=154 f0 and f2=120 f0, using a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase difference associated with a given carrier signal can be determined.

Use of the PRN codes allows, use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0/10=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7,000 days) before this code portion repeats. Accepted methods for generating the C/A-code and P-code are set forth in the document GPS Interface Control Document ICD-GPS-200, published by Rockwell International Corporation, Satellite Systems Division, Revision A, Sep. 26, 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, The NAVSTAR Global Positioning System, Van Nostrand Reinhold, N.Y., 1992, incorporated by reference herein.

A second configuration for global positioning is the Global Orbiting Navigation Satellite System (GLONASS), placed in orbit by the former Soviet Union and presumed to be maintained by the Russian Republic. GLONASS also uses 24 satellites, distributed approximately uniformly in three orbital planes of eight satellites each. Each orbital plane has a nominal inclination of 64.8.degree. relative to the equator, and the three orbital planes are separated from each other by multiples of 120.degree.longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=0, 1, 2, ..., 23) is the channel or satellite number. These frequencies lie in two bands at 1.597–1.617 GHz (L1)and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention. A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

Preferably, the operation of optical unit 3 is automatic. That is, optical unit 3 automatically locates optical target 34 and determines the location of optical target 34. The calculations performed correspond to well known surveying calculations performed to determine the location of a target given the known location and bearing of the measurement device and the latitude and departure of the target from the measurement device. See e.g., Charles A. Herubin, *Prin-*

*ciples of Surveying*, (Prentice Hall, 1991) pp 8–15. In one embodiment, a servo system (not shown) within optical unit 42 aligns theodolite 45 and EDM 44 with optical target 34 of FIG. 3.

Figure 5A:
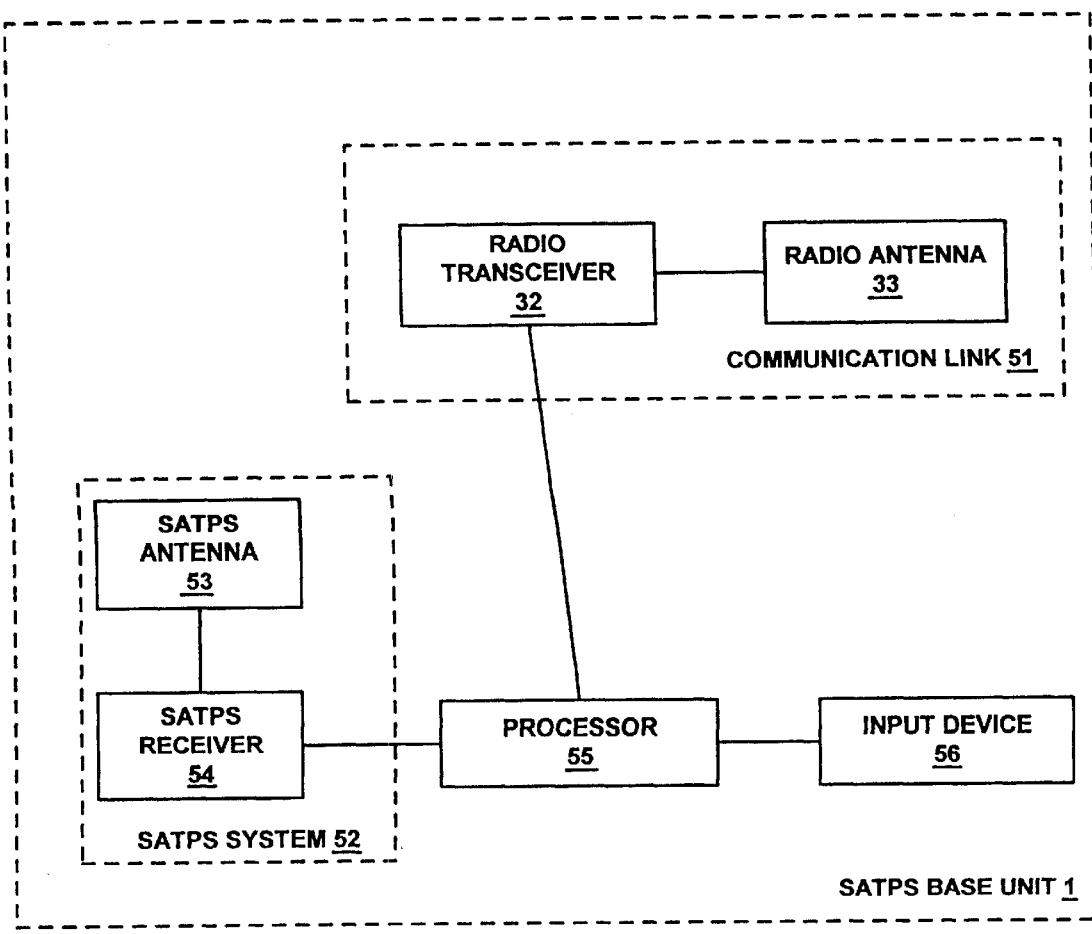
FIG. 5A is a diagram of a SATPS base unit in accordance with the present claimed invention.

FIG. 5A shows an embodiment of a SATPS base unit 1 adapted to receive SATPS signals from satellites of the SATPS and retransmit the received SATPS signals. SATPS system 52 includes SATPS antenna 53 that is adapted to receive signals from SATPS satellites. The received signals are processed by SATPS receiver 54 and are coupled to processor 55. Processor 55 controls the operation of SATPS base unit 1. In one embodiment, SATPS base unit 1 continually receives and retransmits signals received from SATPS satellites. Alternatively, SATPS base unit 1 receives transmissions from rover unit 2, and responds by transmitting signals received from SATPS satellites.

Continuing with FIG. 5A, communication link 51 is used to couple data between SATPS base unit 1 and rover unit 2. Communication link 51 includes radio transceiver 32 and radio antenna 33. Though rover unit 2, optical unit 3, and SATPS base unit 1 of FIGS. 3–5A are shown to include transceivers 32, alternatively, depending on the desired configuration of the system, a transmitter, a receiver, or a separate transmitter and receiver may be used.

In one embodiment, communication links 31, 41, and 51 of FIGS. 3–5A couple data over an unlicensed frequency such as, for example 144 MHz or 900 MHz. Alternatively, other frequency bands could be used for transmitting and receiving data. Alternatively, other methods for coupling data between optical unit 3, SATPS base unit 1 and rover unit 2 of FIGS. 1 and 3–5A may be used such as, for example infrared transmission.

The individual components of optical unit 3 may be incorporated into a single housing. Alternatively, one or all of the components of optical unit 3 may be separate units connected together. Similarly, the components of SATPS base unit 1 of FIG. 5A may be incorporated into a single housing. Alternatively one or all of the components of SATPS base unit 1 may be separate units that are connected together. When separate units are connected together, a communication port and corresponding cables are used, and preferably, the communication port and cables conform to an interface standard such as, for example, RS-232, RS-422, Ethernet, CAN bus/ISO-11898/SAE-J1939, Mil-Std 1553, and the like.

Figure 5B:
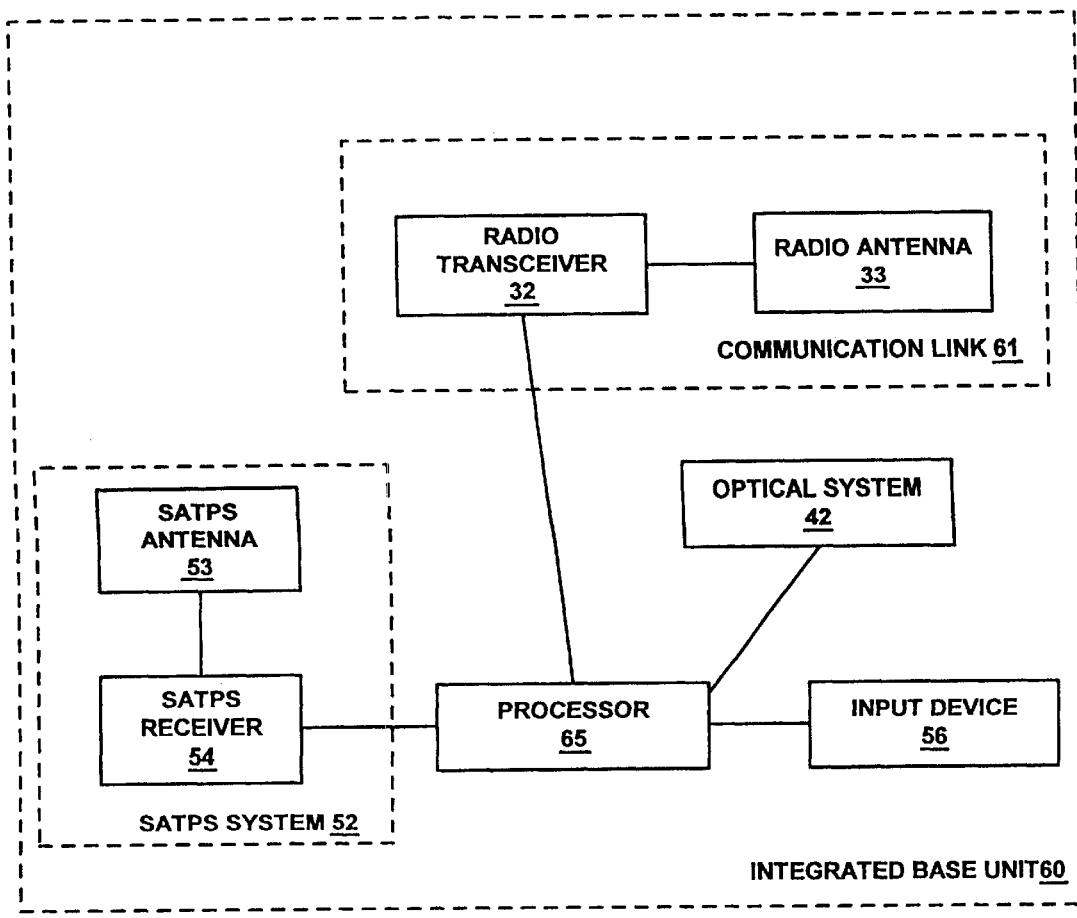
FIG. 5B is a diagram of an integrated base unit that performs the functions of a SATPS base unit and an optical unit in accordance with the present claimed invention.

In an alternate embodiment shown in FIG. 5B the functions of both optical unit 3 of FIG. 4 and SATPS base system 1 of FIG. 5A are incorporated into a single integrated unit that is shown as integrated base unit 60. In this embodiment, communication link 61 transmits and receives both SATPS data and optical data. In one embodiment, processor 65 controls the operations of SATPS system 52, optical system 42 and communication link 61. Input device 56 is operable to input necessary data for operation of optical system 42 and to configure SATPS system 52.

Referring now back to FIG. 3, survey logic unit 36 determines the optimum source of position data (step 22 of FIG. 2). When position is to be determined using SATPS data, SATPS data is received via communication link 31 and is coupled to SATPS processor 36 of SATPS system 30. Signals from satellites of the SATPS are received by SATPS antenna 39 and are coupled to SATPS receiver 40. SATPS processor 36 determines position using the SATPS signals received at SATPS antenna 39 and the signals from SATPS base unit 1.

At least three approaches can be used to determine position using SATPS data. In one approach, SATPS base unit 1 is located at a known location and SATPS data received by SATPS base unit 1 is transmitted to rover unit 2 along with the position of SATPS base unit 1. SATPS processor 36 uses the known location of SATPS base unit 1 and the SATPS data received by SATPS base unit 1 to determine the necessary corrections. SATPS processor 36 then accurately determines location using the determined corrections and signals from satellites of the SATPS received at SATPS antenna 39 and processed by SATPS receiver 40.

In a second approach, SATPS base unit 1 receives signals from satellites of the SATPS and uses its known position to determine the necessary corrections. These corrections are then transmitted to rover unit 2 which uses the correction information, along with signals received from satellites of the SATPS to accurately compute its position.

In a third approach, signals received from satellites of the SATPS are received at SATPS base unit 1 and are coupled directly to rover unit 2. At rover unit 2, signals received from satellites of the SATPS are used along with the signals received at base unit 1 to determine position of rover unit 2 using carrier phase measurement methods. Such methods are well known in the art and are commonly used in RTK position determination. In one embodiment, an appropriate algorithm that resolves integer phase ambiguity is used to determine position with centimeter level accuracy. A useful discussion of algorithms and methods for position determination using multiple SATPS receivers is contained in U.S. Pat. No. 5,519,620 titled Centimeter Accurate Global Positioning System Receiver for On-The-Fly Real-Time Kinematic Measurement and Control which is incorporated herein by reference. Another useful reference that is incorporated herein as background material is Jay Van Sickle, *GPS for Land Surveyors* (Ann Arbor Press, Inc. 1996) pp. 33–110.

In one embodiment, the SATPS of FIGS. 3–5B uses satellites of the GPS to determine position. In this embodiment, SATPS systems 52 is a standard GPS system as are commonly used in RTK positioning systems for determining position. That is, SATPS antenna 53 is a standard GPS antenna and SATPS receiver is a standard GPS receiver adapted to receive signals from satellites of the GPS. In this embodiment, SATPS system 30 of FIG. 3 is a standard GPS system, with SATPS antenna 39, SATPS receiver 40 and SATPS processor 36 adapted to determine position using satellites of the GPS and signals coupled from other GPS systems.

When position is to be determined using optical data, information is coupled to survey logic unit 36 from a source of optical data such as optical unit 3 of FIGS. 1 and 4. In one embodiment, the received information includes a determination of position that is calculated by optical unit 3. Alternatively, position is calculated by processor 37 using information coupled from optical unit 3. When position is calculated by processor 37, the information transmitted from optical unit 3 includes ranging information(i.e. the distance and direction from optical unit 3 to rover unit 2) and the position of optical unit 3. In one embodiment, the position of optical unit 3 (FIG. 4) and the alignment of optical unit 3 are coupled to processor 37 (FIG. 3) along with the angles measured by theodolite 45 and the distance measured by EDM 44.

Referring back to FIG. 2, once position is determined using the optimum source of position information, as shown by steps 20–23, the position is coupled to the user. In one embodiment, the position is displayed on a display device such as display device 31 of FIG. 3. Display device 31 is a liquid crystal display or other suitable display mechanism. Alternatively, or in conjunction with the display of the determined position on display device 31, the position is stored for later analysis (post-processing) in data storage device 38. In one embodiment, data storage device 38 is a Dynamic Random Access (DRAM), a Static Random Access Memory (SRAM), or a flash memory device.

In one embodiment, processors 37, 55 and 65 of FIGS. 3–5B are general-purpose microprocessors such as Motorola 68000 microprocessors. Alternatively, processors 37, 55 and 65 are an ASIC device or a FPGA device.

Figure 6:
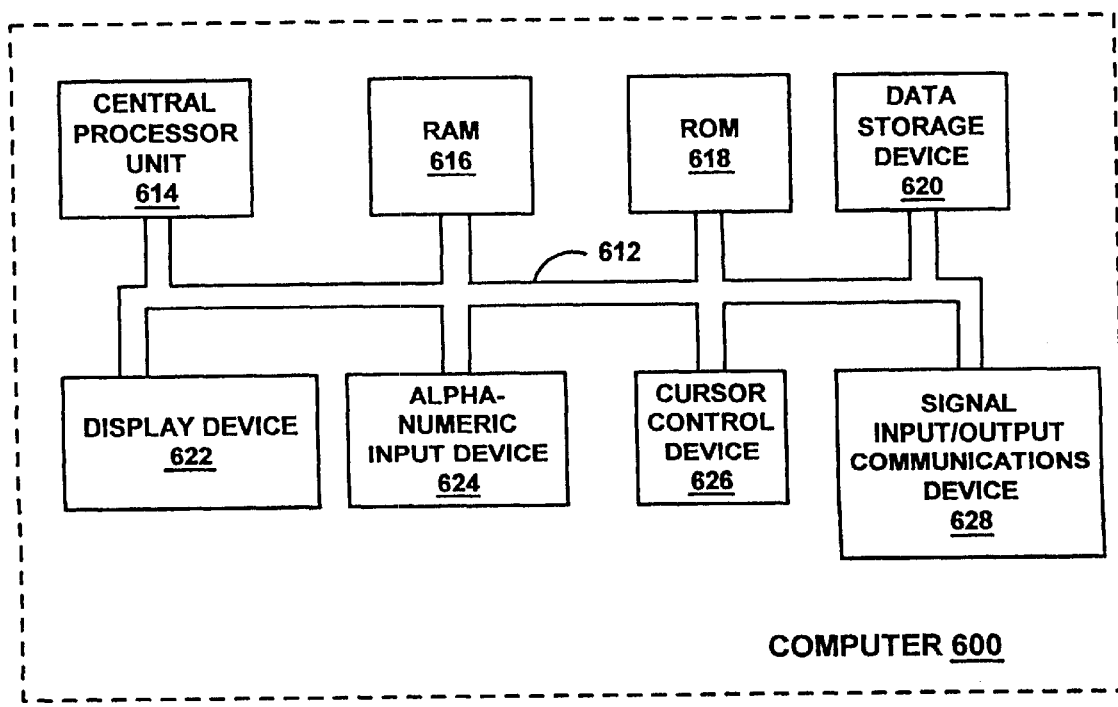
FIG. 6 is a schematic diagram illustrating an exemplary computer system used as part of a seamless survey system in accordance with the present claimed invention.

In one embodiment of the present invention, the seamless surveying system of the present invention is implemented in a computer such as computer 600 shown in FIG. 6. That is, the operations of survey logic unit 36 and/or display device 31 and input device 35 are performed by computer 600. It is appreciated that the computer 600 of FIG. 6 is exemplary only and that the present invention can operate within a number of different computer systems other than the computer system illustrated in FIG. 6. Other computing systems include general purpose computer systems, embedded computer systems, and stand alone computer systems specially adapted for use in the present invention.

Computer 600 of FIG. 6 includes an address/data bus 612 for communicating information, a central processor unit 614 coupled to bus 612 for processing information and instructions, Signal input and output communications device 628 of computer 600 is coupled to bus 612. In one embodiment, signal input and output communications device 628 includes a radio demodulator for demodulating radio signals which may be directly coupled from one or more antennas to input output communications device 628. Alternatively, radio signals may be received, demodulated and transmitted in digital form to input and output through communications device 628. Computer 600 also includes data storage features such as random access memory 616 coupled to bus 612 for storing information and instructions for central processor unit 614, read only memory 618 coupled to bus 612 for storing static information and instructions for the central processor unit 614, and data storage device 620 (e.g., a magnetic or optical disk and disk drive) coupled to bus 612 for storing information and instructions. Computer 600 also includes display device 622 which is coupled to bus 612 for displaying information (e.g., a map showing the position of the rover unit and/or the surveyed site, previously surveyed sites and data points, etc.) to an operator. Computer 600 may also include an output port for transmitting the position to external devices—either other computers or other user interfaces. An alphanumeric input device 624 including alphanumeric and function keys is coupled to bus 612 for communicating information and command selections to central processor unit 614. Computer 600 also includes cursor control device 626 that is coupled to bus 612 for communicating user input information and command selections to central processor unit 614.

Display device 622 of FIG. 6, utilized with computer 600 of the present invention is a liquid crystal device, cathode ray tube, or other display device suitable for creating graphic images and/or alphanumeric characters recognizable to the user. Referring now to FIG. 6, cursor control device 626 allows the computer user to dynamically signal the two dimensional movement of a visible symbol (cursor) on a display screen of display device 622. Many implementations of cursor control device 626 are known in the art including a trackball, mouse, touch pad, joystick or special keys on alphanumeric input device 624 capable of signaling movement of a given direction or manner of displacement. Alternatively, it will be appreciated that a cursor can be directed and/or activated via input from alphanumeric input device 624 using special keys and key sequence commands. The present invention is also well suited to directing a cursor by other means such as, for example, voice commands.

Figure 7:
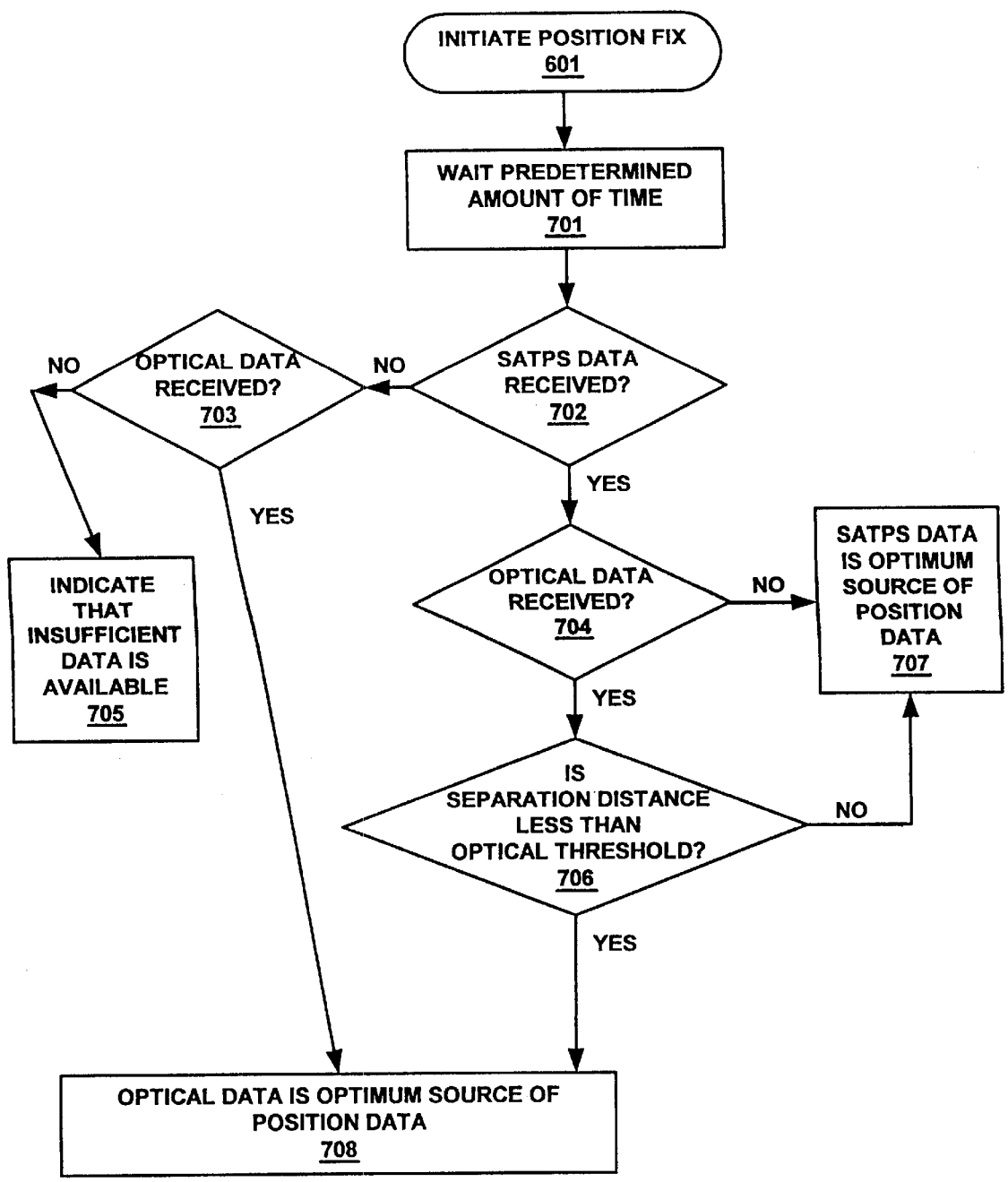
FIG. 7 is a flow chart illustrating a method for determining the optimum source of position data that uses separation distance in accordance with the present claimed invention.

With reference next to FIG. 7, a flow chart illustrating an alternate method for determining the optimum source of position data is shown. Upon initiating a position fix (step 601), a specified amount of time is allowed to pass as shown by block 701. The waiting period may be set, or may be user configurable. The waiting period is sufficient for communication to be received from both a SATPS base unit and an optical unit. In one embodiment, a time of 5 seconds is used. However, depending on the particular equipment being used, it may be desirable to increase or decrease the waiting period to optimize performance.

If, within the predetermined amount of time, SATPS data is not received as shown by decision block 702, and if optical data is not received as shown by decision block 703, accurate determination of the position of the rover unit is not possible. In that event, an indication that insufficient data is available to determine position will be given to the operator of the rover unit as shown by block 705. This indication may be conveyed to the operator of the rover unit by an indicator such as a light emitting diode, or by the display of text, or by use of voice messaging.

Continuing with FIG. 7, if only optical data is received (step 703), then optical data is used to determine position (step 708). If only SATPS data is received, as shown by steps 702 and 704, SATPS data is the optimum source of position data as shown by step 707.

Still referring to FIG. 7, when both SATPS data and optical data are received during the predetermined amount of time, a switch over threshold (hereinafter "optical threshold") is used to determine the best source of position data. That is, an optical threshold is determined such that optical position data give an accurate position fix when the distance between the optical unit and the rover is less than the optical threshold. In effect, the optical threshold determines the range within which optical position data is to be used. In one embodiment, the threshold is set at 100 meters. Alternatively, the threshold may be user-defined so as to allow the user to select a threshold that meets the user's specific needs.

Still referring to FIG. 7, as shown by block 706, if both optical data and SATPS data are available, and if the separation distance between the rover and the base station is less than the optical threshold distance, then the optical data is designated as the optimum source of position data as shown by block 708. When both optical data and SATPS data are available from a rover that is at a distance greater than the optical threshold distance, SATPS data is designated as the optimum source of position data as shown by block 707.

Figure 8:
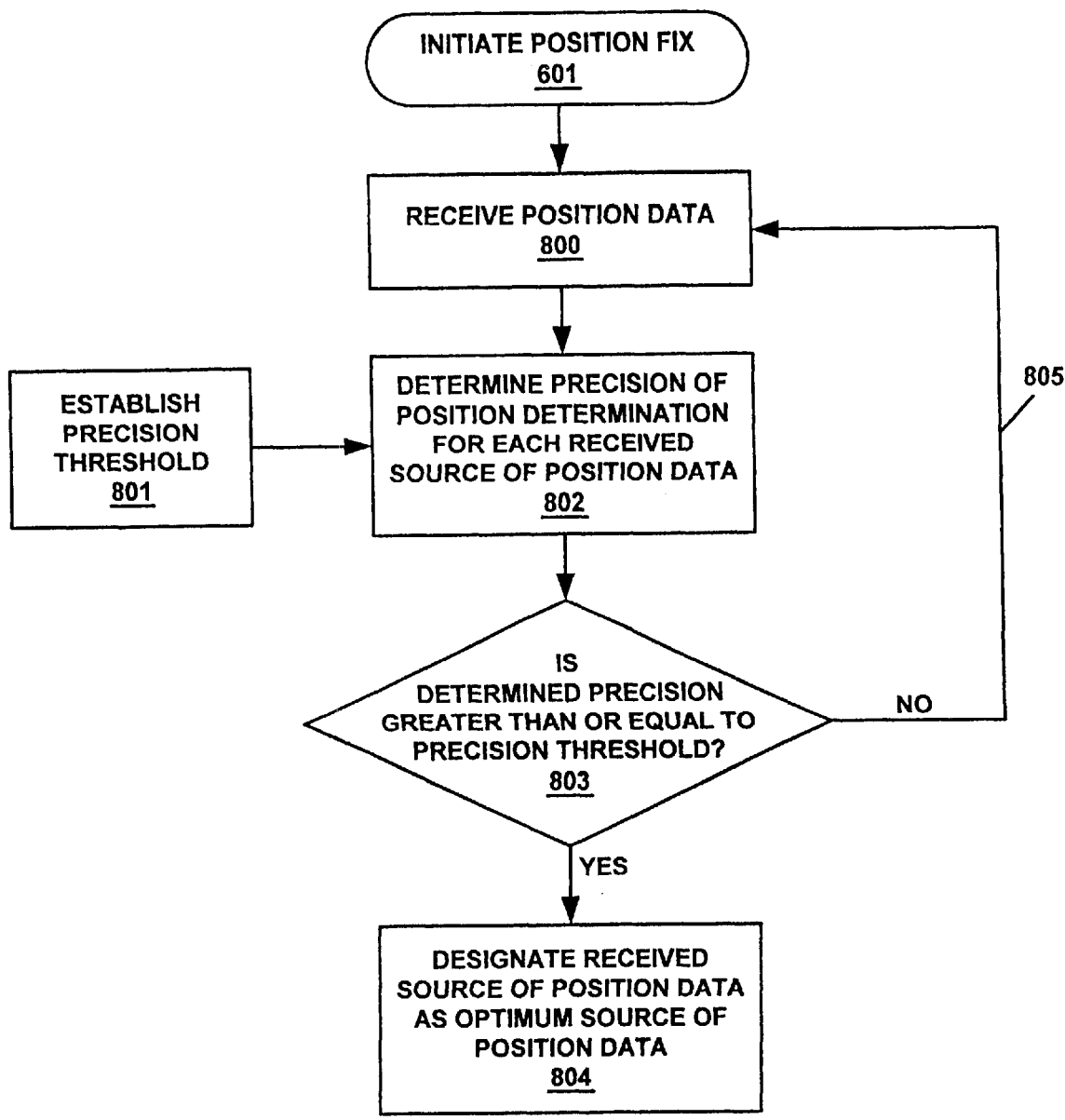
FIG. 8 is a flow chart illustrating a method for determining the optimum source of position data that uses a precision threshold in accordance with the present claimed invention.

In another embodiment that is shown in FIG. 8, the determination of the best source of position data is driven by the desired precision. That is, the user determines the desired precision such as, for example, two to three centimeters. This precision setting is used for determining the best source of position data. First, the desired precision threshold is established as shown by step 801. In one embodiment, the desired precision is set at two centimeters.

Continuing with FIG. 8, position data is received as shown by step 800. In one embodiment, a rover unit such as rover unit 2 of FIGS. 1 and 3 is used.

Still referring to FIG. 8, each type of incoming position data is analyzed to determine the precision of the determination of position that would be obtained using the incoming position data as shown by step 802. This process may be performed using any of a number of known methods. In one embodiment, the signal to noise ratio of incoming SATPS data is used. Alternatively, other factors such as the number of SATPS satellites received or the geometry of the received satellites is used in determining the precision. When the incoming data is optical data, the signal strength and/or the distance between the optical unit and the rover is used to determine the precision of the determination of position.

The determination of precision for each received source of position data is then compared to the precision threshold as shown by step 803. If the precision for a source of position data is greater than or equal to the precision threshold, that source of position data is selected as the optimum source of position data as shown by step 804. Otherwise, as shown by arrow 805, the process continues until such time that an incoming source of position data meets the established precision threshold. Thus, the first source of position data that gives a position within the desired accuracy range is designated as the optimum source of position data.

Referring now to FIG. 9, in one embodiment, weighting factors are applied so as to weight optical position data and SATPS position data separately. In one embodiment, separation distance and signal strength are used to weight each incoming optical data source.

Continuing with FIG. 9, the number of satellites received by the rover unit, distance between the rover unit and the base unit (separation distance), and RTK correction data accuracy are taken into account in weighing SATPS data. In one embodiment, RTK correction data accuracy is determined using the number of satellites received at the base unit, cycle slips, and measurement quality. Cycle slips are a function of the number of continuously locked measurements of correction data broadcast by the base station. Measurement quality is a statistical estimator of the inherent uncertainty of the measurement process. Measurement quality can take many forms, including standard deviation of the actual measurements, Root Mean Square (RMS), Circular Error Probability (CEP), Carrier/Noise Ratio (C/No), or some other Figure of Merit for relative comparison of different measurement sources.

Referring still to FIG. 9, the weighting factors for each variable are multiplied with the respective variable and the total for both optical data and SATPS data is summed. Whichever data source has the highest total is used as the optimum data source.

Figure 10:
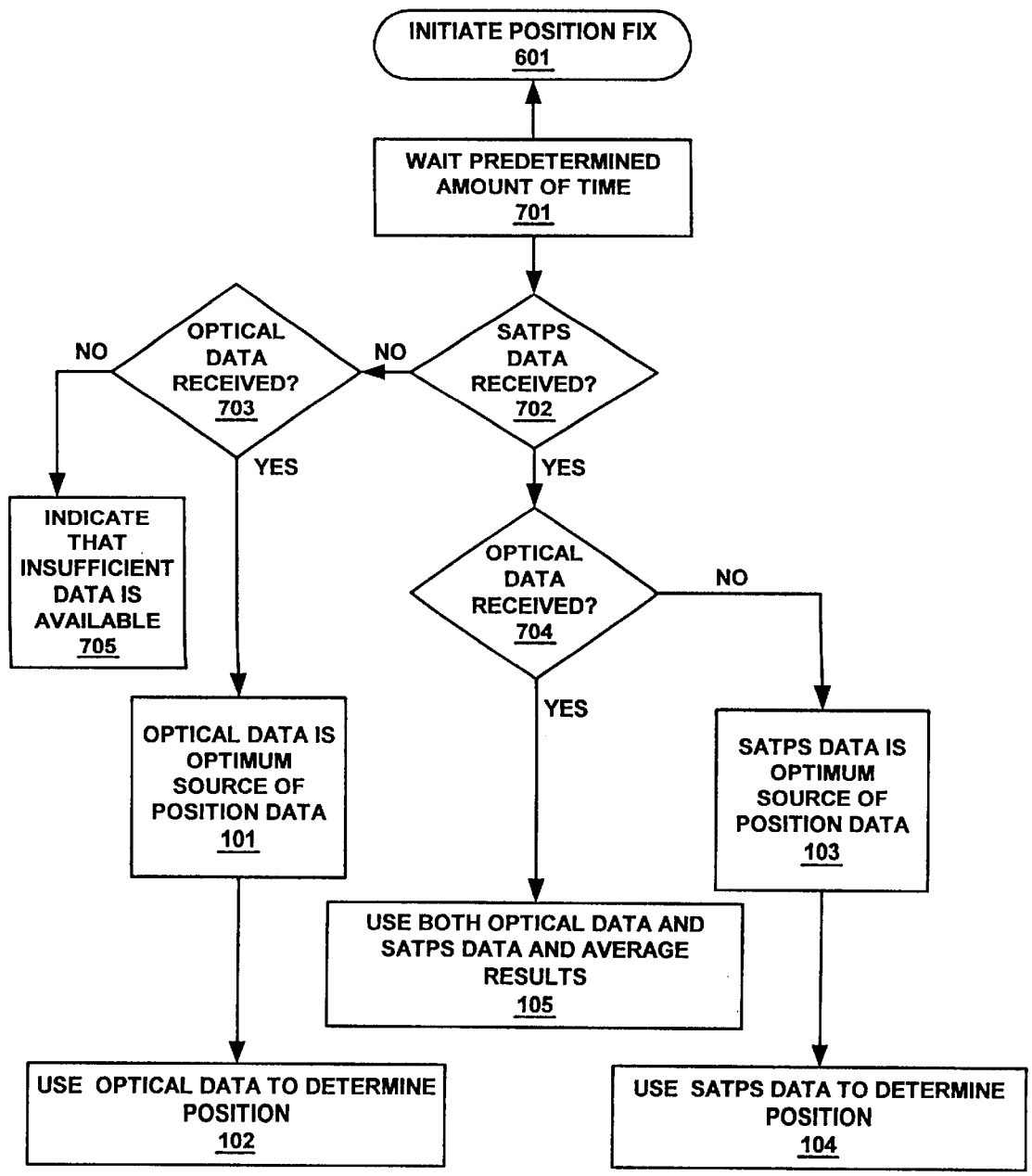
FIG. 10 is a flow chart illustrating a method for accurately determining position in accordance with the present claimed invention.

FIG. 10 shows yet another embodiment of the present invention. As shown by steps 601, 701–703 and 705, if no position data is received after a predetermined amount of time, an indication that insufficient data is available is given. If only one source of position data is available, that source of position data is designated as the optimum source of position data. More specifically, as shown by steps 701–703, when optical data is the only source of position data, optical data is designated as the optimum source of position data (step 101) and is used to determine position (step 102). Similarly, as shown by steps 701, 702 and 704, when SATPS data is the only source of position data, SATPS data is designated as the optimum source of position data (step 103) and is used to determine position (step 104).

Continuing with FIG. 10, when both optical data and SATPS data are received, both optical data and SATPS data are used to determine position and the results are averaged to determine position as shown by step 105.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A seamless surveying system for use with a satellite positioning system (SATPS) comprising:

a first unit including a radio transceiver and antenna, a first SATPS receiver, a first SATPS antenna, said first unit being adapted to receive and transmit SATPS data;

a second unit including a radio transceiver and antenna, a radiation source for irradiating a target with transmitted radiation, a means for receiving reflected radiation from said target, a means for determining the distance between said target and said radiation source from said transmitted radiation and said reflected radiation, and an instrument for determining horizontal and vertical angles, and a second communication link; and a third unit including a radio transceiver and antenna, a target capable of reflecting said transmitted radiation, a third communication link for communicating with said first unit and said second unit, a second SATPS antenna, a second SATPS receiver, a SATPS processor, and a logic unit for selecting an optimum data source.

2. The system of claim 1 wherein said instrument is an electro-optical instrument.

3. The system of claim 2 wherein said instrument comprises a laser.

4. The system of claim 1 wherein said SATPS includes at least one pseudolite.

5. The system of claim 1 wherein said instrument senses a magnetic field.

6. The system of claim 1 wherein said logic unit is configured to select the first source of position data that gives a position within the desired accuracy range as the optimum data source.

7. The system of claim 1 wherein said logic unit is configured to select said optimum data source on the basis of said distance between said target and said radiation source.

8. A method for determining a position based upon data from an optimum data source for a survey system that includes a first data source for obtaining SATPS data, a second data source for obtaining alternative data exclusive of SATPS data and a third unit adapted to determine position, said method comprising:

a) initiating a position fix;

b) receiving data at said third unit from ones of the group consisting of said first data source and said second data source;

c) determining at said third unit the optimum data using the data received in step b), and wherein the first received data is designated to be the optimum data; and d) determining the position of said third unit.

9. The method of claim 8 wherein said alternative data is obtained in part by the use of an electro-optical device.

10. The method of claim 8 wherein said alternative data is obtained in part by the use of an instrument for sensing a magnetic field.

11. In a computer system including a processor coupled to a bus, and a memory unit coupled to said bus for storing information, a computer implemented method for determining the optimum data set for a survey system which includes a first data source adapted to receive SATPS data and a second data source adapted to receive alternative data exclusive of SATPS data, said computer implemented method comprising:

a) initiating a position fix;
b) receiving position data from ones of said first data source and said second data source; and
d) determining the optimum data using said position data received in step b), and wherein the first received data is designated to be the optimum data for the determination of the position.

12. The method of claim 11 wherein said SATPS data is in part obtained from at least one pseudolite.

\* \* \* \* \*